United States Patent [19]

Kadono et al.

[11] Patent Number: 4,998,210

[45] Date of Patent: Mar. 5, 1991

[54] CHARACTER GENERATOR

[75] Inventors: Takashi Kadono; Takashi Morikawa, both of Toyokawa, Japan

[73] Assignee: Minolta Camera Kabushiki Kaisha, Osaka, Japan

[21] Appl. No.: 390,486

[22] Filed: Jul. 31, 1989

Related U.S. Application Data

[63] Continuation of Ser. No. 011,516, Feb. 5, 1987, abandoned.

[30] Foreign Application Priority Data

Feb. 5, 1986 [JP] Japan .................................. 61-24838

[51] Int. Cl.$^5$ .............................................. G06F 15/00
[52] U.S. Cl. ..................... 364/518; 340/748; 340/750; 340/799; 340/731
[58] Field of Search ............... 340/730, 731, 744, 724, 340/798, 799, 748, 750, 735, 790; 364/521, 519, 518

[56] References Cited

U.S. PATENT DOCUMENTS

| | | | |
|---|---|---|---|
| 4,345,245 | 8/1982 | Vella et al. | 340/744 |
| 4,566,002 | 1/1986 | Miura et al. | 340/727 |
| 4,567,570 | 1/1986 | Peer | 364/900 |
| 4,616,219 | 10/1986 | Tanaka et al. | |
| 4,622,546 | 11/1986 | Sfarfi et al. | 340/748 |
| 4,646,259 | 2/1987 | Lincoln et al. | 364/900 |
| 4,660,998 | 4/1987 | Tsuneki | 400/61 |
| 4,660,999 | 4/1987 | Tsuneki | 400/61 |
| 4,679,038 | 7/1987 | Bantz et al. | 340/721 |
| 4,680,578 | 7/1987 | Hornig et al. | 340/731 |
| 4,757,312 | 7/1988 | Asai et al. | 340/750 |
| 4,849,747 | 7/1989 | Ogawa et al. | 340/735 |

*Primary Examiner*—Dale M. Shaw
*Assistant Examiner*—Phu K. Nguyen
*Attorney, Agent, or Firm*—Price, Gess & Ubell

[57] ABSTRACT

A character generator for generating character patterns based on pattern data stored in a font memory held in at least one font cartridge which is detachably loaded in the character generator. The font memory is divided into a plurality of banks each of which has a predetermined memory capacity. Every font data includes global information data which indicates at least a kind and memory volume thereof together with character pattern data. The global information data is stored in a predetermined area of a bank into which font data are to be stored at first. A font management means is provided for managing a plurality of fonts stored in each font cartridge by accessing global information stored in the font memory.

7 Claims, 7 Drawing Sheets

Fig. 1

| bank 0 | (0H-7FFFFH) | first font cartridge |
|---|---|---|
| " 1 | (80000H-0FFFFFH) | |
| " 2 | (100000H-17FFFFH) | |
| " 3 | (180000H-1FFFFFH) | |
| " 4 | (200000H-27FFFFH) | |
| " 5 | (280000H-2FFFFFH) | |
| " 6 | (300000H-37FFFFH) | |
| " 7 | (380000H-3FFFFFH) | |
| " 8 | (400000H-47FFFFH) | second font cartridge |
| " 9 | (480000H-4FFFFFH) | |
| " 10 | (500000H-57FFFFH) | |
| " 11 | (580000H-5FFFFFH) | |
| " 12 | (600000H-67FFFFH) | |
| " 13 | (680000H-6FFFFFH) | |
| " 14 | (700000H-77FFFFH) | |
| " 15 | (780000H-7FFFFFH) | |

CHARACTER GENERATOR

This is a continuation of application Ser. No. 011,516 filed on Feb. 5, 1987, now abandoned.

BACKGROUND OF THE INVENTION

1. Field of the Invention

The present invention relates to a character generator which utilizes font cartridges detachably loaded thereinto.

2. Description of the Prior Art

A character generator reads character pattern data in a font by accessing a font memory according to a character code instructed by a host machine such as a host computer, and sends the character pattern data to an output apparatus such as a printer.

In a character generator of this kind, it is desirable that a variety of fonts such as a font for small or large size characters and/or a font having a lot of characters is available in order to satisfy a variety of requirements by users.

Some character generators adopt a system in which a variety of the font cartridges having font memories is loaded. A font cartridge is one of external memories, and it stores data of character patterns included in one or more fonts.

Information data defining attributes of a font such as a capacity thereof, a kind thereof and so on stored in a font cartridge are stored in an area of memory means of the cartridge specified by predetermined addresses (Hereinafter, these information data on a font or a font cartridge are referred to as global information.) A microprocessor (CPU) for controlling the character generator identifies each cartridge by reading global information stored in said area.

As far as a conventional font cartridge is concerned, only one kind of font is stored in one font cartridge. Therefore, the global information of each of the font cartridges leaded is stored in an area having the same addresses as those of other font cartridges. Accordingly, the CPU identifies a font cartridge loaded by reading the data stored in the same area for each of them, and the kind and the characters of fonts stored in the font cartridges can be managed by accessing the addresses for every cartridge.

If the number of font cartridges to be loaded in a character generator is limited to a small number, it is desirable to store a plurality of kind of fonts in one font cartridge in order to generate many kinds of font at the same time.

In such a case wherein a plurality of kind of font is stored in a font chartridge, the CPU of a character generator should identify all of fonts stored in the respective font cartridges loaded. It is also desirable that the management by the CPU allows the capacity of font data and the number of fonts to be set freely.

SUMMARY OF THE INVENTION

An object of the present invention is to provide a character generator having a management system for a plurality of font cartridges each of which can store a plurality of kinds of font.

A character generator according to the present invention comprises: at least one font cartridge being loaded detachably into the character generator and having font memory means for storing pattern data of characters belonging to one or more fonts, said font memory means consisting of a plurality of banks each of which has a predetermined memory capacity, said banks being ordered in the memory space in a predetermined order; font data means including said pattern data of characters and global information data for indicating the kind and the volume of memory space of each font, said global information data being stored in such a manner that, if the volume of font data of a font is equal to or smaller than the predetermined memory capacity of a bank, said global information data are stored in a predetermined area of a bank which is so defined as to have a predetermined relation to the top address of the bank, and that, if the former is larger than the latter, said font data are stored over successive banks and said global information data are stored in the predetermined area of the top bank of said successive banks; font management means, including means for determining with respect to every bank whether the bank is a bank wherein said global information data is stored or one of successive banks wherein no global information data are stored by reading data stored in the predetermined area of every bank.

It is an advantage of the present invention to provide a character generator wherein a plurality of kinds of fonts can be stored in a font cartridge.

It is another advantage of the present invention to provide a character generator wherein the number, the capacity and the combination of fonts can be set freely so that the font management becomes easy.

BRIEF DESCRIPTION OF THE DRAWINGS

The invention will now be described with reference to the accompanying drawings wherein.

DESCRIPTION OF PREFERRED EMBODIMENTS (a) Font memory space (character map)

A character generator of an embodiment of the present invention can load two font cartridges at the same time.

Figure 1:
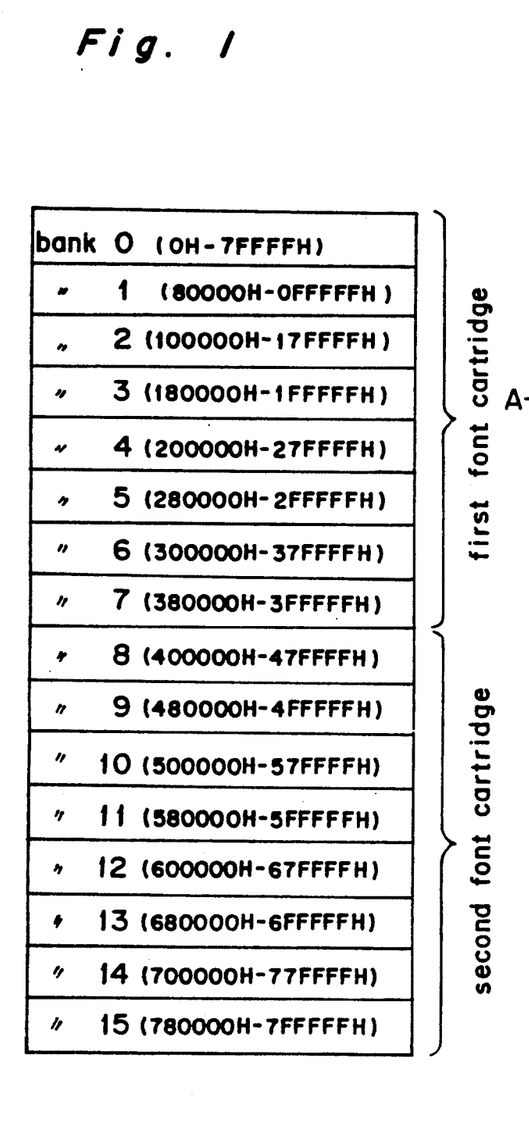
FIG. 1 is an address map of font memory in relation to banks.

A memory space of the font cartridges is divided into a plurality of banks, and the addresses of the memories form a continuous memory space. The banks from bank 0 to bank 7 and those from bank 8 to bank 15 are each mounted on a font cartridge, as shown in FIG. 1. The global information of the data on character patterns of fonts may be stored at the determined addresses which is related to the top address of each bank. When the data of character patterns of fonts is stored extending over a plurality of banks, the global information is not written in banks (or continuous banks) which follow the first bank (or the top bank) where the global information is stored.

CPU 6 (FIG. 4) which controls a character generator reads the data of the predetermined addresses of the banks successively. If the global information is read, the fonts are managed according to the global information.

FIG. 1 shows a memory space provided in a character generator. The memory space has a capacity of eight Mbytes. Addresses are designated therein from zero to 7FFFFFH successively. The memory space divided into sixteen banks from bank 0 to bank 15, each of which has memory size of 512 Kbytes. A numeral after "bank" is called a bank number.

In the character generator according to this preferred embodiment, two font cartridges can be loaded. Banks from the zeroth to the seventh one are assigned to the first cartridge and the remaining banks from the eighth to the fifteenth one are assigned to the second cartridge.

Both a read-only-memory (ROM) and a random-access-memory (RAM) may be used as a font memory according to uses.

Figure 2:
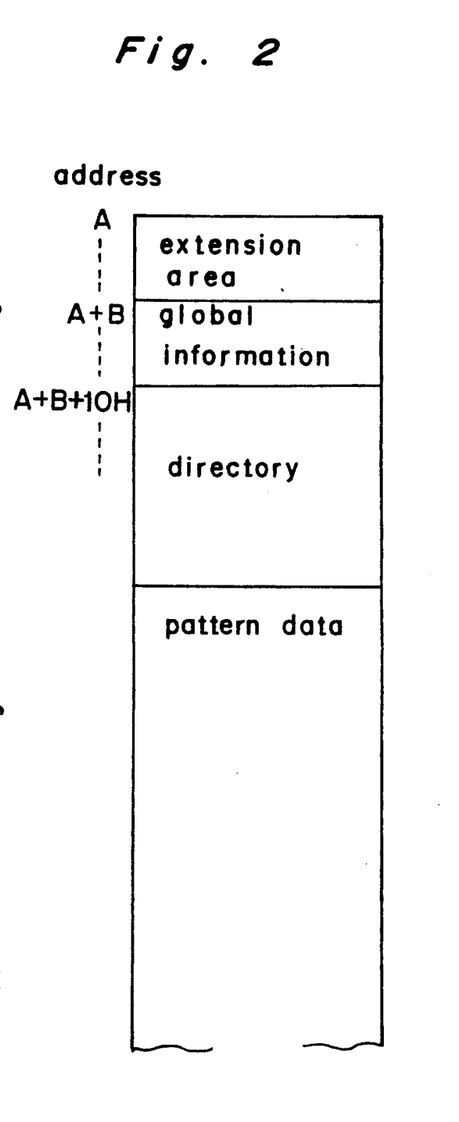
FIG. 2 is an example of an address map of font memory.

A series of dot pattern data of each of the fonts including directory data is stored in a font cartridge in an area of corresponding bank of the memory space which is determined so as to start from an address specified by adding a predetermined number B to the top address A of a bank, as shown in FIG. 2. Even when the preceding bank has a blank memory area after all the character data of a font has been stored therein, the data of the next font are stored after the predetermined address of the next bank.

The starting address A+B of said memory area for storing the dot pattern data can be adopted arbitrarily and for example, the value B can be zero, namely the head address of a bank.

If a series of dot pattern data of a font is to be stored over two or more banks because of a large volume thereof, they are stored in banks in the increasing order of bank number.

As shown in FIG. 2, the global information of ten bytes of each font is arranged always at the top of a series of font data in an area which starts from an address A+B after an extension area which starts from the head address A of a bank.

Figure 3A:
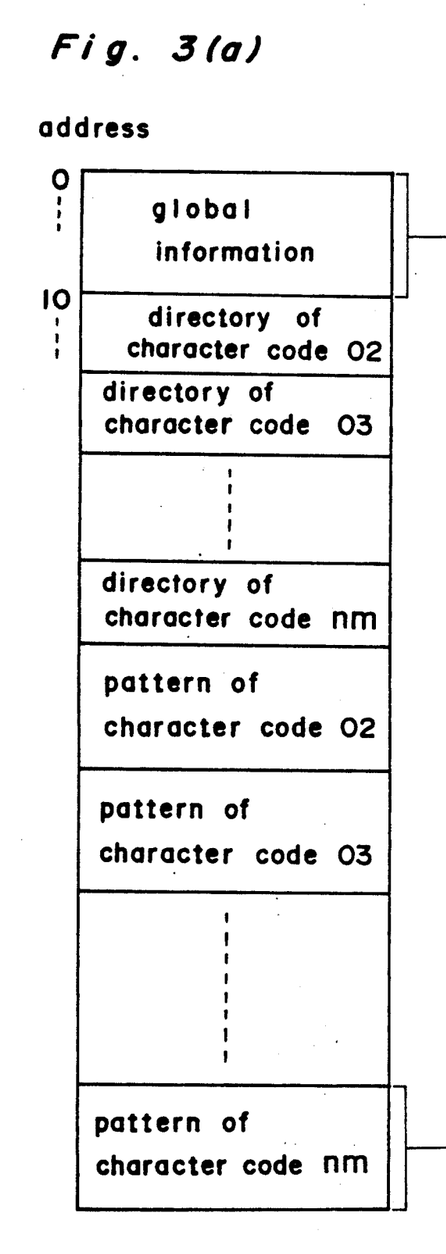
FIG. 3(a) is another example of an address map of font memory, and FIGS. 3(b) and (c) are examples of data stored in the font memory.
Figure 3B:
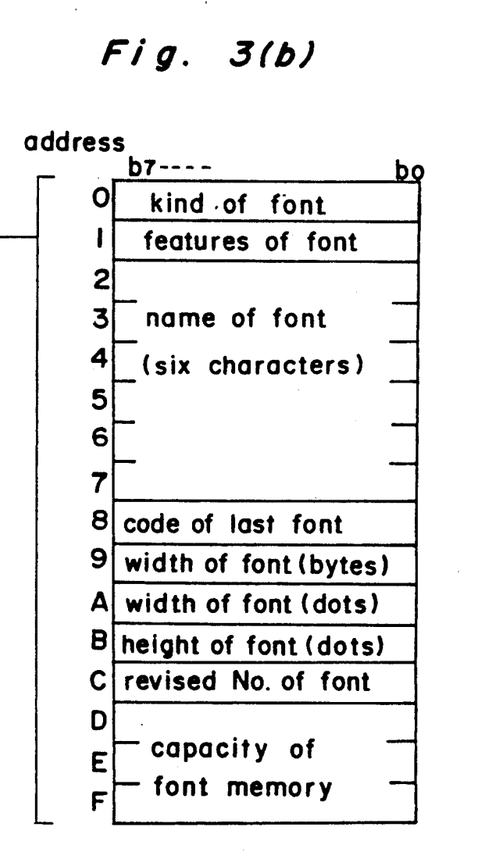

As shown in FIG. 3(b), the global information consists of the kind of font, the characteristics of font, the name (of six characters) of font, the code of the last character, the width of character in unit of byte, the width of character in unit of dot, the height of character in unit of byte, the revised number and the capacity of memory of font. The characteristics include font style (standard, slant), thickness (broad, standard, narrow), mode (monospace, proportional), use (typewriter, type setter) and position (vertical, horizontal).

Figure 3C:
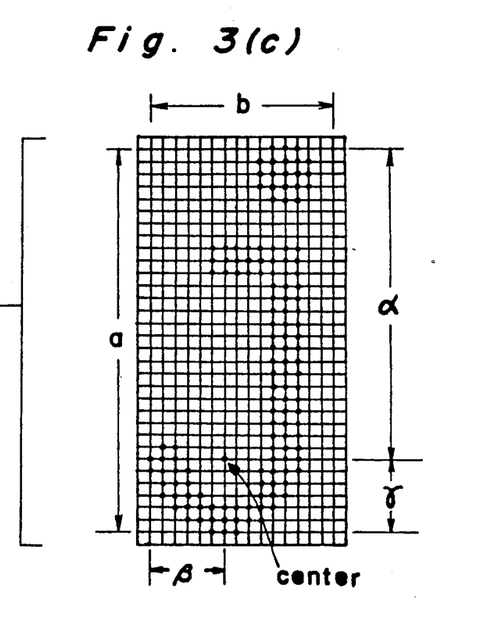

After the global information, as shown in FIG. 2 and FIG. 3(a), each of the directories of characters being identified by character codes respectively is stored successively. Then, patterns of individual characters corresponding to character codes are stored successively. The pattern of a character can be a dot pattern, as shown in FIG. 3(c), and the directory of a character includes not only the top address of the dot pattern of the character but also parameters (a, b, $\alpha$, $\beta$, $\gamma$) of the pattern as are defined in FIG. 3(c).

Sixteen kinds of font at the maximum can be stored each in sixteen banks of the memory of the font cartridge if the memory capacity of every font does not exceed 512 Kbytes. In other words, each font cartridge can store eight kinds of font at the maximum. A font cartridge may also store only one kind of font of a capacity of eight Mbytes or less.

(b) a character generator

Figure 4:
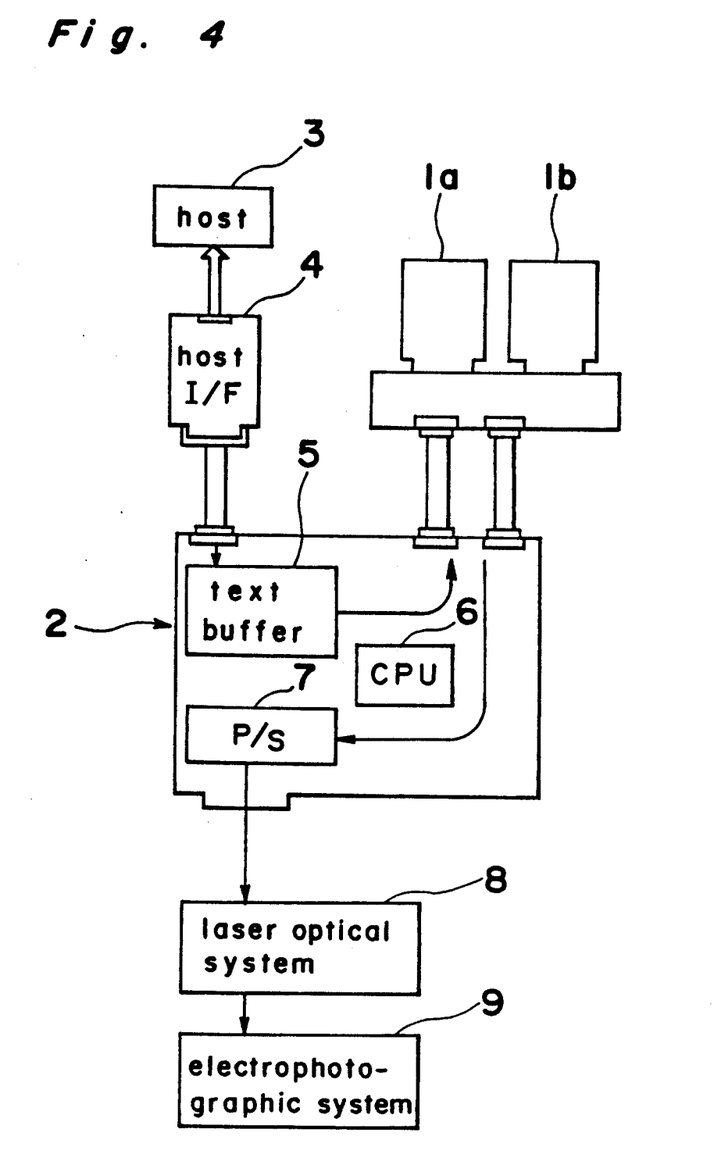
FIG. 4 is a block diagram of a character generator connected with font cartridges.

FIG. 4 shows a block diagram of a character generator 2 which can load two font cartridges 1a, 1b. A character map method is used for the generation of character in the present preferred embodiment. A host machine (computer) 3 transforms data of every character of a text to be printed into a character code, and sends the character code to a text buffer 5 of the character generator 2. The text buffer 5 stores an amount of character data corresponding to one page of a text to be printed as an array of character codes together with control data for the control of printing such as printing positions of characters. CPU 6 which controls the character generator 2 has already obtained all of the global information, as will be explained in section (d), of individual fonts stored in the font cartridges 1a, 1b. After the data of one page are stored in the text buffer 5, CPU 6 reads every character code stored in the text buffer 5 successively, and reads the data of the pattern indicated by the character code out of either one of the font cartridges 1a, 1b. The pattern data is transformed into a serial data by a parallel-to-serial transformation circuit 7, and the serial data is sent to a laser optical system 8 of a laser printer and is written on a photoconductor of an electrophotography system 9 of the laser printer. Then, characters are printed out on a paper with use of an electrophotographic process.

A bit-map method wherein pattern data read from a font memory are written once in a bit-map memory can also be used for the generation of characters.

(c) Management system of fonts

In the present preferred embodiment according to the present invention, data of one font may be stored in a plurality of successive banks. In such a case, the global information of the font is written in the head portion of the first bank, while only pattern data are written in the head portion of other banks. Even a blank bank may exist, as will be explained later. Therefore, CPU 6 which controls the character generator 2 should read the global information after distinguishing whether a true global information is stored in the head portion of a bank or not, in order to manage the kind and characteristics of font.

If a method of managing fonts is adopted in which all of the global information of individual fonts are stored in a predetermined area of the memory area of a respective font cartridge, all of global informations of fonts stored in the respective font cartridge can be read out of the predetermined area. However, this method has a problem in practical use. That is, when a combination of fonts stored in a font cartridge is changed, the global information should necessarily be revised.

In the preferred embodiment according to the present invention, a font management method is adopted wherein the combination of fonts can be changed freely. That is, data is stored in the predetermined area of each bank which begins from predetermined address when the address of each bank are read out, and it is decided whether the bank is a font ROM, a RAM or blank. If the bank is a font ROM, the total capacity of the font is read from the global information. If the font extends over a plurality of banks by deciding from the total capacity having been read, global information is not written in banks following the first (top) bank. Therefore, the data in the predetermined area of a bank which locates next to the last one of banks over which said one font is stored are read next.

(d) generation of characters

Figure 5:
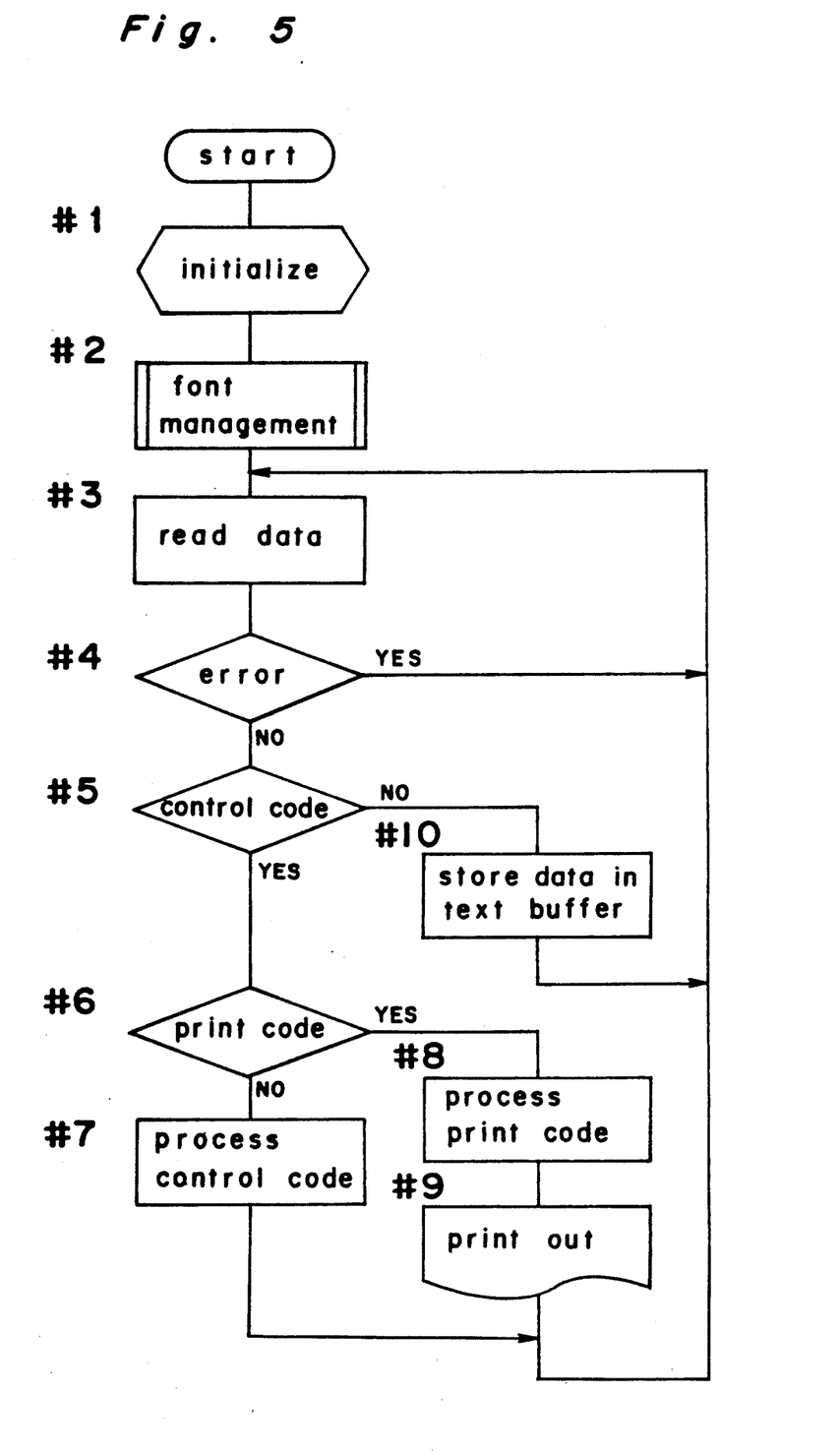
FIG. 5 is a flowchart of the generation of characters.

FIG. 5 shows a flow of the generation of characters according to a character-map method. When an electric power source of the character generator 2 is turned on, the work area of the RAM is initialized, and parameters to be used for the control of the character generator 2 are set to the initial values (step #1). Next, the global informations of individual fonts stored in the font cartridges 1a, 1b which have been loaded in the character generator 2 are read in order to check available fonts (step #2). Details will be explained later in section (e).

Then, data (a code) is received from the host machine 3 (step #3). If no errors are detected in the data (step #4), it is decided next whether the data is a control code for the edition of text or not (step #5). If the decision is yes, it is decided next whether the control code is a print code or not (step #6). If the decision is no, the program branches to a process routine according to the control code for a process such as font select, setting of the number of papers or the setting of margin (step #7), and the program returns to step #3.

If the code is decided not to be a control code in step #5, it is decided that the code is a character code (print data). Then, the top address of the pattern of a character in correspondence to the code found by referring to the font address is written in the text buffer 5 (step #10). Then, the program returns to step #3.

If the control code is decided to be a print code in step #6, the processing for the print-out proceeds (step #8). Thus, the characters stored as character codes in the text buffer 5 is printed out by referring the font cartridges 1a, 1b (step #9). Then, the program returns to step #3.

(e) Font management

Figure 6:
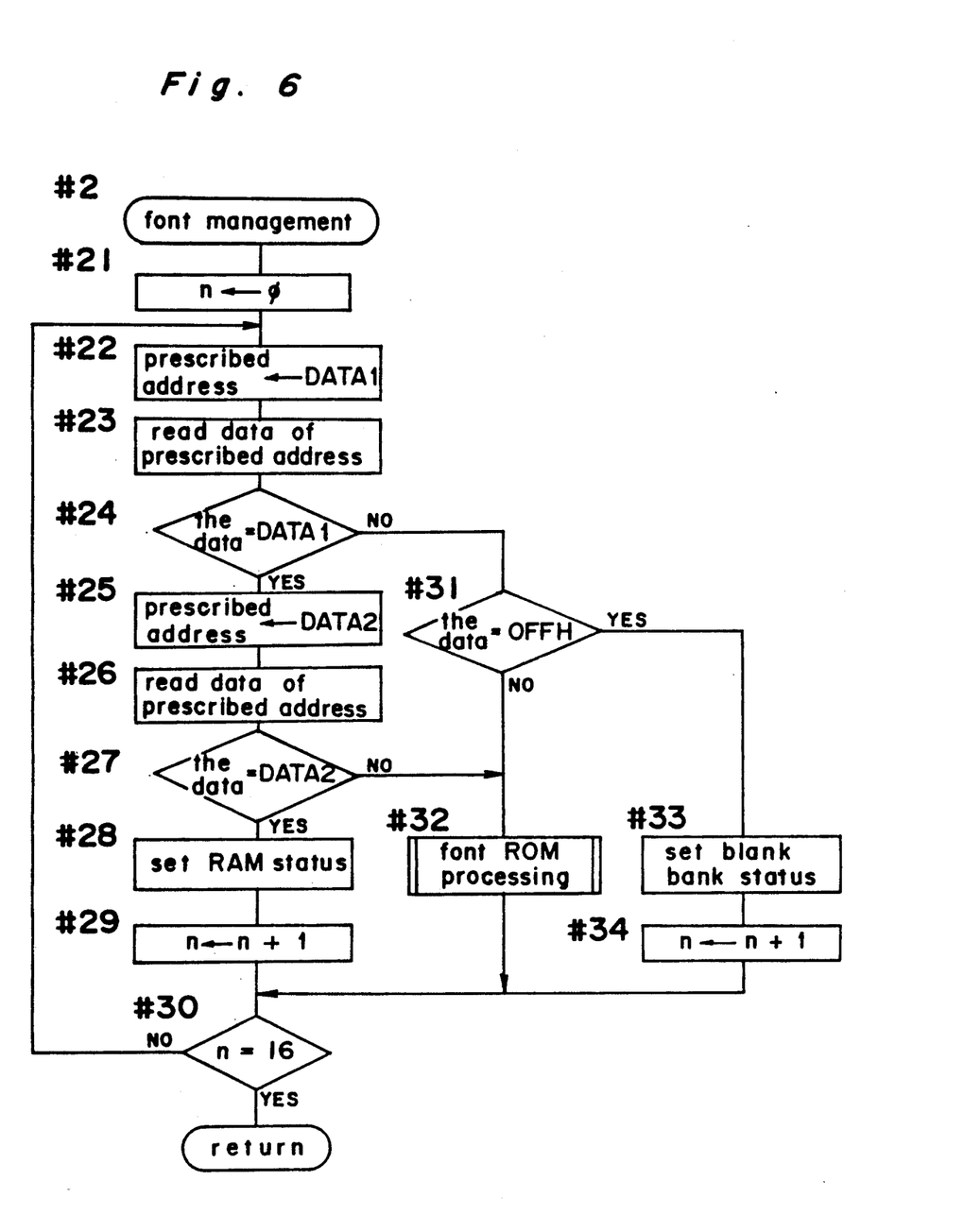
FIG. 6 is a flowchart of font management.

FIG. 6 shows a flow chart of font management. The character map (see FIG. 1) consists of sixteen banks, a half of which is included in each font cartridge 1a, 1b. There are four kinds of the state of bank; a top bank wherein a series of the data of each font are stored first, a successive bank wherein the rest of the data of each font are stored successively after the top bank, a RAM bank into which a font desired by a user can be loaded, and a blank bank.

First, a value (bank number) n of the bank counter which designates a bank is set to be zero (step #21). Next, any data (DATA 1) except OFFH is written in bank n (which is zero at present) at the predetermined address (the top address in this embodiment) (step #22), and then the data at the predetermined address is read (step #23).

Next, it is decided whether the data having been read out coincides with the written data (DATA 1) (step #24). If both data coincide with each other, the bank n may be a RAM bank. Therefore, another data (DATA 2) other than OFFH is written and is read out again (step #25, #26), and it is decided again whether the written data coincides with the read data (step #27). If both data coincides again, it is decided that the bank n is set as a font RAM, and the status of bank n is set as RAM status (step #28). Then, the value n of the bank is increased in order to check a next bank (step #29).

If both data do not coincide with each other at the second time at step #27, it is decided that the coincidence obtained at step #24 is accidental and that the bank n stores font data, and the processing for font ROM management which will be explained later starts (step #32), and the program goes to step #30.

If both data do not coincide at the first time at step #24, it is decided next whether the read data is OFFH or not (step #31). If the decision is yes, it is decided that the bank n is a blank bank, and the status of the bank n is set as a blank bank status. Then, the value n of the bank counter is increased by one (step #34).

If the value n of the bank counter is decided to be sixteen (step #30), the program returns to the main flow since the process of managing fonts has completed for all banks. If the value n is less than sixteen, at least one bank to be checked remains still so that the program returns to step #22.

Figures 7, 8:
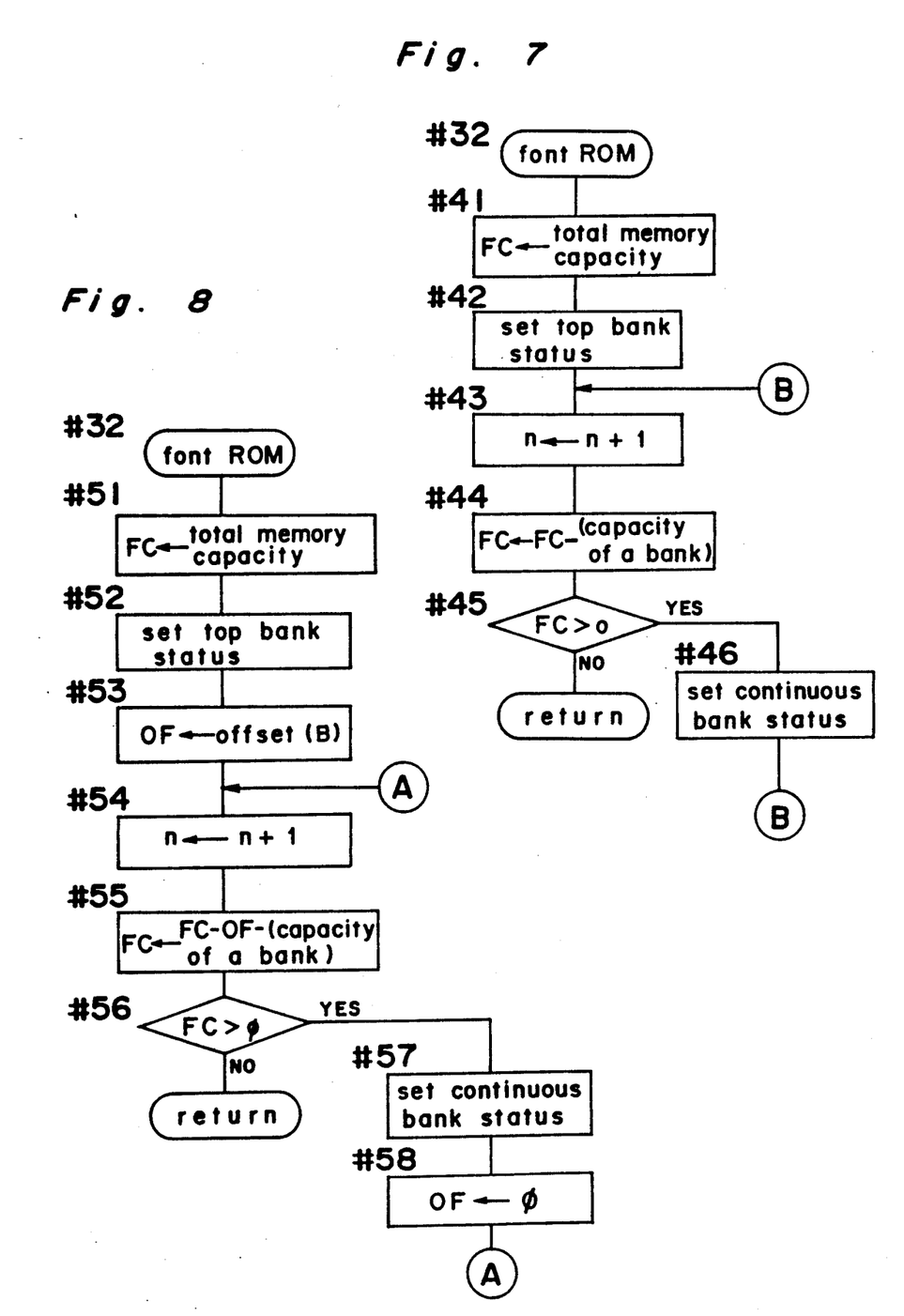
FIG. 7 is a flowchart of font ROM processing.
FIG. 8 is another flowchart of font ROM processing.

FIG. 7 shows a flow of font ROM processing (step #32) for font management.

First, the total memory capacity (the total number in bytes) of font included in the global information is read out, and it is set in a register FC (step #41), and the status of the bank is set to be top bank status (step #42).

Then, the number n of the bank counter is increased by one (step #43) in order to check a next bank. The value of register FC is decreased by a memory capacity of a bank (step #44), and it is decided whether FC is larger than zero or not (step #43). If FC is larger than zero, the total memory capacity of font is larger than that of a bank. Then, it is decided that the next bank under processing is also a font ROM, and the state of the bank is set to be successive bank status (step #46). As far as FC is larger than a memory capacity of a bank, the same processing is repeated.

If FC is zero or less at step #45, it is decided that the bank under processing is not a successive bank, and the program returns to step #43.

Thus, four kinds of status of the bank are set for all sixteen banks in order to manage fonts when the electric power source is turned on.

In the preferred embodiment above mentioned, the global information is stored in the head area which begins at the zeroth address. However, an area for memorizing the global information can be started from the B-th address when counted from the zeroth address. In this case, the head area defined from the zeroth to (B-1)-th address is used for other purpose, for example, to store another dot regarding a font as an extended area.

FIG. 8 shows a flow of font ROM processing in this case. This flow is roughly the same as that shown in FIG. 7 except that the offset value B of the location of the global information is set in a register OF for the first bank (step #53) and that FC is decreased by a sum of both bank capacity and OF (step #55). The value of the register OF is set to be zero if the next bank is decided to be a successive bank (step #58).

(f) Down load of font

Figure 9:
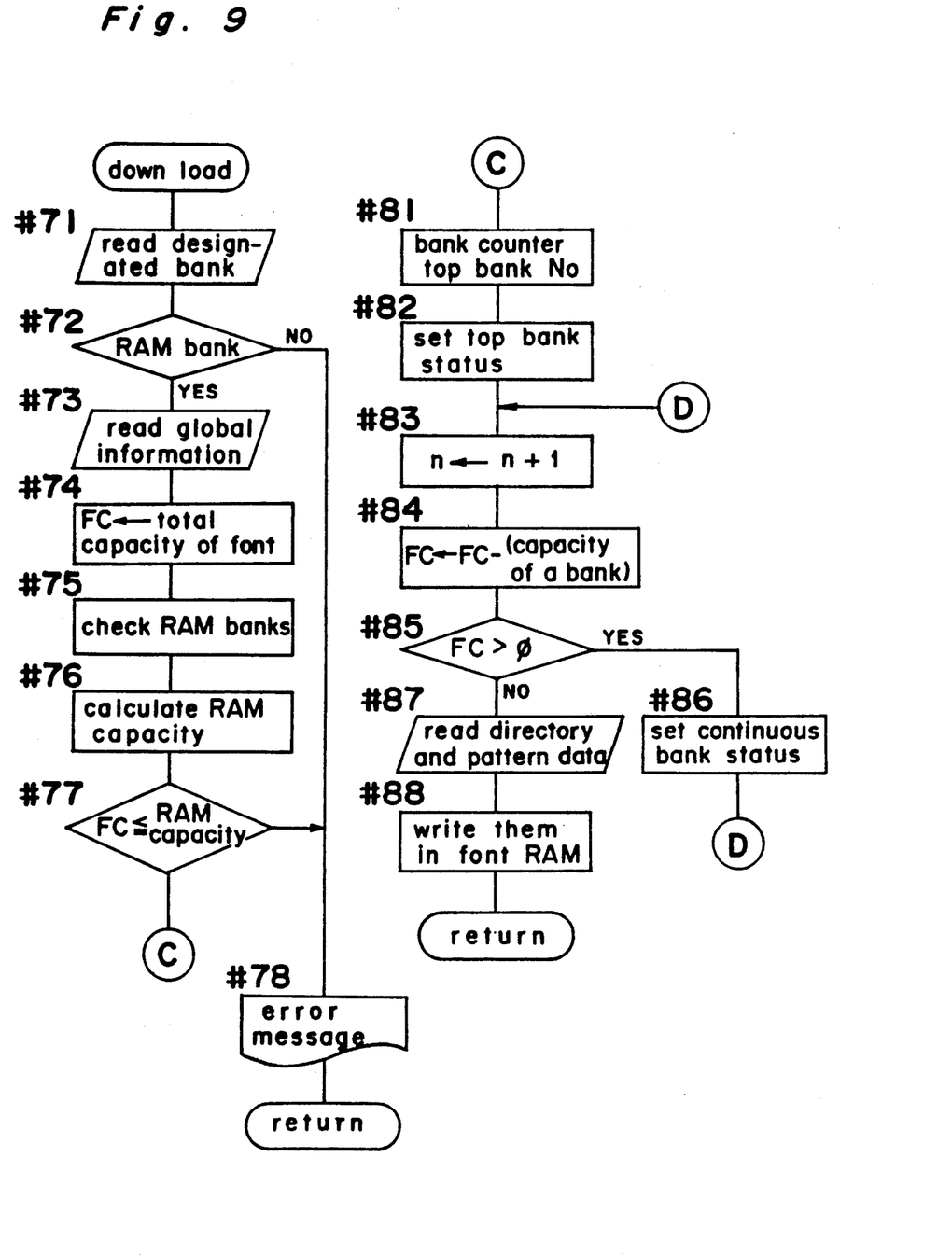
FIG. 9 is a flowchart of a down-load.

When the down-load of fonts possessed by a user is requested from the host machine 3 (step #5 in FIG. 5), the down-load to a font RAM is processed in step #7, as shown in FIG. 9. Data to be received by the character generator 2 from the host machine 3 consist of both of top bank of the RAM banks and font data having a construction of those already explained with respect to the font ROM (see FIG. 3(a)).

The character generator 2 first receives the designation of the top bank (step #71). Then, it is decided that the top bank is a RAM bank or not (step #72) by referring the bank status which has been registered in step #2. If the top bank is not a RAM bank, an error message is sent to the host machine 3 (step #78), and the process completes.

If the top bank is a RAM bank, the global information is read (step #73), and the total memory capacity of a font included in the global information is set in a register FC (step #74). Then, RAM banks which follow the top RAM bank are checked (step #75), and the total capacity of the RAM banks is calculated (step #76). Next, it is decided whether the total RAM capacity is sufficient for the down-load or not (step #77). If the total RAM capacity is deficient, an error message is sent to the host machine 3 (step #73), and the process completes.

If the total RAM capacity is sufficient for the download, the designated bank number n is set in the bank counter (step #81), and the top bank status is set (step #82).

The following processing is similar to that shown in FIG. 7. First the value n of the bank counter is increased by one (step #82), and the variable FC is decreased by the memory capacity of a bank (step #84). Then, it is decided whether FC is larger than zero or not (step #85). If the decision is yes, the bank under processing is decided to be a following RAM bank so that the successive bank status is set (step #86), and the program returns to step #83 in order to process a next bank. If the decision is no at step #85, it is decided that the bank under processing is not a successive bank. Then, the directory and the pattern data of font are received from the host machine 3 (step #87), and they are written in the font RAM (step #88).

The preferred embodiments described herein are illustrative and not restrictive, the scope of the invention being indicated by the appended claims and all variations which come within the meanings of the claims are intended to be embranced herein.

What is claimed is:

1. A character generator for generating character patterns according to character codes and a designated font, which comprises:
    at least one font cartridge being loaded detachably into the character generator and having a font memory means for storing pattern data of characters belonging to one or more fonts, said font memory means consisting of a plurality of banks each of which has a predetermined memory capacity, said banks being ordered in the memory space in a predetermined order;
    font data means comprised of font data that includes said pattern data of characters and global information data for indicating the kind of font and the volume of memory space of each font, said global information data being stored in such a manner that,
        if the volume of font data of a font is equal to or smaller than the predetermined memory capacity of a bank, said global information data is stored in a predetermined area of a bank located at a predetermined displacement from the top address of the bank, and that,
        if the volume of font data of a font is larger than the predetermined memory capacity of a bank, said font data is stored in a top bank and at least one successive bank and said global information data is stored only in the predetermined area of said top bank whereby additional memory space is available for storage of said pattern data of said font in said at least one successive bank; and
    font management means, including means for determining with respect to every bank whether the bank is a top bank wherein said global information data is stored or whether the bank is an at least one successive bank wherein no global information data is stored by reading data stored in the predetermined area of every bank.

2. A character generator according to claim 1, wherein said pattern data includes dot pattern data of character and directory data on the address of dot pattern data.

3. A character generator according to claim 1, wherein said font memory means of said font cartridge is comprised of a read-only memory mans and random access memory means for storing data.

4. A character generator according to claim 3, wherein said font management means further includes a deciding means for deciding whether each of the banks belongs to said read-only memory means or not, said deciding means writing predetermined data into the predetermined area of the bank and, then, reading written data therein to compare read data with said predetermined data and deciding that the bank belongs to the read-only memory means if the read data does not coincide with said predetermined data and that the bank belongs to the random access memory means if the read data coincides with said predetermined data.

5. A character generator according to claim 1, wherein said font management means sets each total memory volume of a font having been read from the global information stored to a memory means of the character generator, subtracts the memory capacity of each bank from said total memory volume having been set, increments a number for indicating a bank number by one and repeats said subtraction until the result thereof becomes negative.

6. A character generator according to claim 5, wherein said font management means designates a number indicating the bank number at the time that the result of said subtraction repeated becomes negative as a bank number of a bank to be read next by said font management means.

7. In an improved character generator system with a character generator for generating character patterns according to predetermined character codes with predetermined fonts having means for removably receiving a font cartridge, the improvement comprising:
    a font cartridge, removably attachable to the means for receiving a font cartridge including a font memory means for storing pattern data of characters belonging to one or more fonts, the font memory means includes a plurality of banks of predetermined addresses to provide predetermined memory capacity in a predetermined order, some banks are contained in a read-only memory while other banks are contained in a random access memory;
    font data means stored in the font memory means including pattern data of characters and global information data for indicating the kind and volume of memory space for each font, said global information data being stored in such a manner that,
        if the volume of font data of a font is equal to or smaller than the predetermined memory capacity of a bank, said global information data is stored in a predetermined area of a bank which is so defined as to have a predetermined relation to the top address of the bank, and that, if the volume of font data of a font is larger than the predetermined memory capacity of a bank, said font data is stored over successive banks and said global data is stored only in the predetermined area of the top bank of said successive banks; and
font management means, including means for determining with respect to every bank whether the bank is a bank wherein said global information data is stored or whether the bank is one of successive banks wherein no global information data and only font data is stored by reading data stored in the predetermined area of every bank.

* * * * *